Dec. 15, 1953 W. S. BAKER 2,662,801
PISTON RING
Filed May 14, 1949
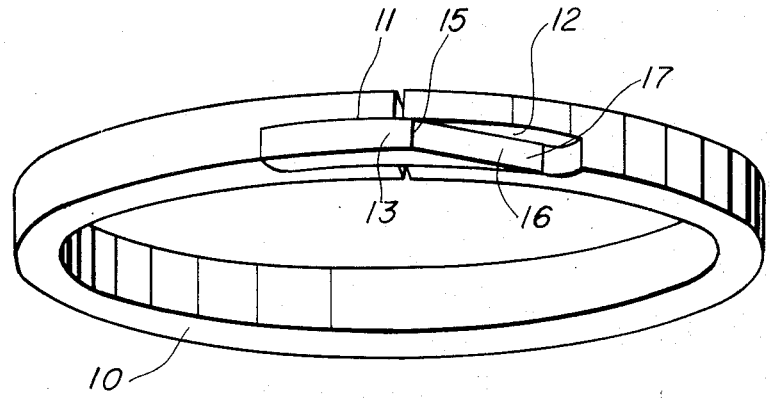
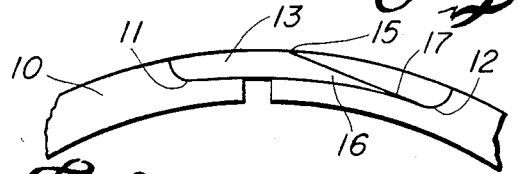
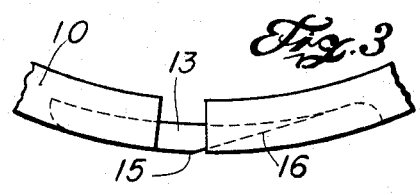
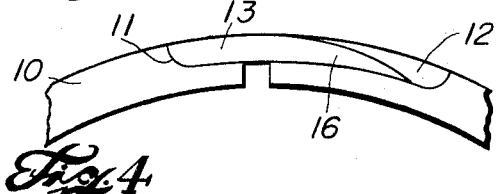
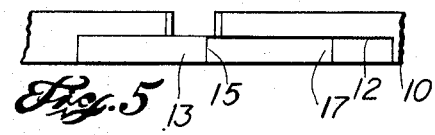
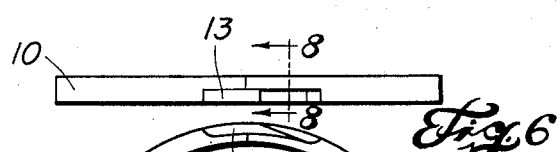
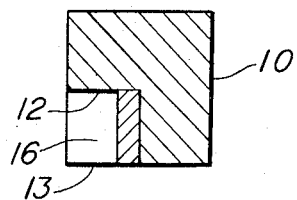
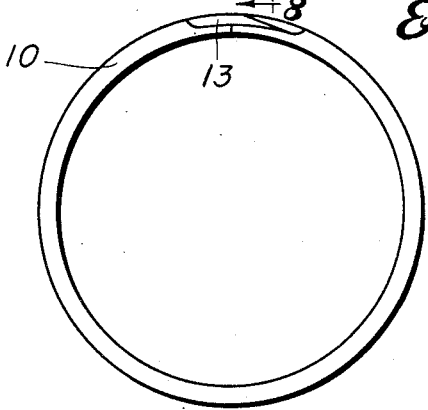
Inventor
William S. Baker
By Ahley & Ahley
Attorneys Patented Dec. 15, 1953

2,662,801

UNITED STATES PATENT OFFICE 2,662,801

PISTON RING

William S. Baker, Fort Worth, Tex.

Application May 14, 1949, Serial No. 93,357

8 Claims. (Cl. 309—46)

This invention relates to new and useful improvements in piston rings.

One object of the invention is to provide an improved one piece piston ring of the overlapping gap type.

A particular object of the invention is to provide a piston ring which is an improvement over the type shown in my Letters Patent No. 1,975,344, issued October 2, 1934; and, at the same time to overcome the disadvantage discovered in my previous structure which arises through the tendency of the overlapping tongue to be forced outwardly under pressure of the fluid to which the ring is subjected.

A further object of the invention is to provide an improved one piece piston ring wherein the overlapping or tongue element has its radial thickness tapered or reduced adjacent its end whereby the pressure of a fluid exerted upon the tongue urges the same into more secure and snug engagement with its groove rather than tending to wedge or lift the tongue from said groove and against the cylinder wall.

Yet another object of the invention is to provide an improved piston ring of the type described wherein catching or hanging of the projecting tongue in cylinder wall ports is eliminated.

A construction designed to carry out the invention will be hereinafter described together with other features of the invention.

The invention will be more readily understood from a reading of the following specification and by reference to the accompanying drawing, wherein examples of the invention are shown, and wherein:

Fig. 1 is an isometric view, taken from the lower side of a piston ring constructed in accordance with this invention, Fig. 2 is an underside view of the split portion of the ring, Fig. 3 is a plan view of the split portion of the ring, Fig. 4 is a view similar to Fig. 2 and illustrating a modification of the invention, Fig. 5 is a view similar to Fig. 3 and illustrating a modification, Fig. 6 is a side elevation of the ring, Fig. 7 is a plan view of the entire ring, and Fig. 8 is an enlarged sectional view taken upon the line 8—8 of Fig. 6.

It is a recognized fact that fluid under pressure above the piston of an internal combustion engine, a steam engine, a compressor, or the like, will flow over the upper side of the piston ring and into the space beneath the ring and within the groove within which the ring is carried. This fluid will build up a pressure behind the ring and within the groove which will normally be somewhat less than that exerted upon the face or head of the piston, but which may reach sizeable proportions. In a similar fashion, this fluid under pressure often works its way across the lower side of the piston ring and into the space therebelow between the outer wall of the piston and the cylinder wall. When more than one sealing ring is employed, this fluid under pressure will continue to work its way downwardly with a decrease in pressure between each ring.

A perfectly fitting piston, ring and cylinder will prevent this random escape of fluid under pressure. However, experience shows that vibration, uneven cylinder walls, wavey ring grooves, the rocking motion often assumed by a piston, and probably many other forces, affect the operation of the piston ring and may allow the leaking fluid under pressure to build up a substantial pressure below the piston ring. In the case of the ring disclosed in my above identified patent, this pressure is present at the gap-bridging tongue and the groove within which said tongue slides, and it has been found that this pressure is sometimes sufficient to "wedge" between the tongue and the bottom of the groove in which it rides so as to force the two apart and press the outer end of the tongue with unusual force against the cylinder wall. This action necessarily results in scoring and grooving of the cylinder wall, and sometimes causes a premature failure of the tongue itself because of the high stresses to which it is subjected. Further, in cylinders having exhaust and/or intake ports in their walls, the tongue may be forced into such ports and damaged.

It is known that new piston rings do not fit a cylinder wall nor the piston groove in which they are seated until they have been in operation long enough to wear to a close fit. During this wearing in or breaking in period, a relatively high pressure may build up at times below the piston ring and give rise to exaggerated instances of the phenomena recited above. As the pressure forces the tongue from close engagement with the bottom of its groove, the pressure beneath and behind the ring is equalized by the opening of this passage therebetween with the result that the groove carrying end of the piston ring is in balance so far as fluid under pressure is concerned, and depends solely upon its resiliency for engagement with the cylinder wall. On the other hand, the tongue is subjected to this full pressure and is urged thereby against the cylinder wall. Thus, the outer end of the tongue is urged with considerable force against the cylinder wall and a condition is created which results in premature injury or destruction of both the ring and the cylinder wall or liner.

Proceeding now with a description of one embodiment of the invention, the numeral 10, in the drawing, designates the annulus or body of a one piece piston ring. In carrying out my invention, I preferably make a split annulus, as is shown in Fig. 1, in the usual manner and of a material best suited for the purpose. It is not necessary to go into the manufacture of this member as it may vary according to the process adopted. Grooves 11 and 12 are formed in the end portions of the ring so as to extend circumferentially and inwardly from the ends of the gap. These grooves may extend approximately half the axial thickness of the ring, and are cut inwardly to approximately half the radial thickness of the annulus.

The grooves may be produced in any suitable manner as by milling, or otherwise cutting out the metal, or in any other suitable and practical way. It is desirable to machine the groove 12, but this is not necessary in the groove 11. However, where the grooves are cut by milling tools, no further machining or finishing will be necessary. An arcuate tongue 13 is mounted in the groove 11. This tongue has its inner and outer arcuate surfaces struck on arcs concentric to those of the annulus when the ring is fully compressed or closed. The tongue bridges the gap between the ends of the ring and has its free end disposed in the groove 12. Any suitable or desirable portion of the tongue 13 may be suitably brazed or otherwise secured into the groove 11 for securing the tongue in position. Thus, as set forth in my previous patent, identified hereinabove, only the inner end of the tongue may be welded, brazed, or otherwise secured to the annulus and within the groove 11. Of course, the brazing, welding, or other securing may be extended along the entire length of the tongue which lies within the groove 11, the particular method and extent of securing being unimportant insofar as this invention is concerned. The groove 12 is of a greater length than the projecting portion of the tongue 13 and hence is capable of receiving the entire length of said projecting portion even when the ring 10 is fully closed or collapsed. The tongue has a sliding fit within the groove 12 and the ring operates in the usual manner insofar as sealing of the gap between the ends of the annulus 10 by the tongue 13, is concerned.

It is here pointed out that the ring and tongue may be formed from one piece of metal instead of by the securing process recited. The invention is concerned with the shape of the tongue and not its fabrication.

The projecting end of the tongue 13 is tapered inwardly or reduced in thickness radially from a point 15 spaced a short distance from the departure of the tongue from the groove 11, to the outer end or extremity of said tongue. This tapered portion 16 of the tongue thus presents a wedge-like structure when viewed from the outer surface of the ring.

The tongue 13 retains full cross-sectional size and area from its point of departure from the groove 11 to the point 15, and thus an adequate portion of the tongue is provided for bridging the gap between the ends of the ring 10 when the tongue is positioned within the groove of a piston (not shown). As shown in Fig. 1, the inner circumferential surface of the tongue continues as a portion of an arc conforming to the bottom of the groove 12, but the outer circumferential wall or face of the tongue begins to taper inwardly toward the bottom of the groove 12. This tapering may be accomplished in a planar fashion as illustrated in Figs. 1 through 3 whereby the tapered portion of the tongue is in the form of a straight-sided wedge. On the other hand, the tapering may be accomplished as illustrated in Figs. 4 and 5 in which the radius of curvature of the outer circumferential surface of the tongue is decreased from the point 15 and said outer surface curves smoothly inwardly and toward the bottom of the groove 12. In either instance, the snug engagement of the inner circumferential surface of the tongue with the bottom of the groove is maintained, and the outer circumferential surface of the tongue adjacent the end or outer extremity thereof, is also directed toward the bottom of the groove 12 and merges thereinto to provide a thin, tapered, and relatively sharp end 17 which abuts or lies against the bottom of the groove 12.

With the structure described above, the undesirable effect of the pressure occurring within the groove 12 beyond the outer end of the tongue 13, is entirely eliminated, and the damaging and undesirable results flowing from such effect are avoided. In previous structures, as pointed out hereinbefore, this pressure tended to move the outer end of the tongue toward the cylinder wall and away from the bottom of the groove 12 by forcing fluid between the tongue and the bottom of the groove. This "wedging" action resulted in both the leakage of fluid and loss of pressure, and also caused the outer end of the tongue to wear and score the cylinder wall. The present structure avoids this difficulty by the provision of the relatively thin and flexible end 17 for the sealing tongue. The pressure acts against this end 17 and urges it into snug engagement with the bottom of the groove 12, thereby preventing the loss of pressure and preventing the entry of fluid under pressure between the tongue and the bottom of the groove to urge the tongue outwardly into a position where it can score or wear the cylinder wall.

It is further pointed out that the tongue is protected by this tapered configuration from catching or hanging in ports in the cylinder wall. It is the outer extremity of the tongue that is usually so caught, and since, in this invention, the tongue's outer end is well within the outer periphery of the ring proper, it cannot catch in ports in the cylinder wall with the resultant damage to both the cylinder and the ring.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A piston ring having an outer face constructed to engage a cylinder wall, said ring comprising, a split resilient annulus having a groove in its outer face extending inwardly from one of its split ends, and a tongue extending from the opposite end of said annulus and lying in said groove, the extremity of the tongue being reduced radially in thickness to form a tapered end on said tongue less in width than that portion of the groove adjacent said tongue end, the latter being spaced radially inwardly from the outer periphery of the ring when the ring is normally compressed.

2. A piston ring as set forth in claim 1 wherein the tongue has an inner circumferential surface, the outer circumferential surface of the tongue approaching and intersecting said inner circumferential surface.

3. A piston ring as set forth in claim 2 wherein the outer circumferential surface of the tongue approaches the inner circumferential surface thereof in a straight line.

4. A piston ring as set forth in claim 2 wherein the outer circumferential surface of the tongue approaches the inner circumferential surface thereof in a curved line.

5. A piston ring having an outer face constructed to engage a cylinder wall, said ring comprising, a split resilient annulus having a groove in its outer face extending inwardly from one of its split ends and a tongue extending from the opposite end of the ring and lying within the groove, the inner circumferential surface of the tongue snugly engaging the bottom of said groove, the tongue being progressively reduced in radial thickness from a point within the groove when the ring is compressed to the outer extremity of said tongue to form a tapered end on said tongue less in width than that portion of the groove adjacent said tongue end, the latter being spaced radially inwardly from the outer periphery of the ring when the ring is normally compressed.

6. A piston ring having an outer face constructed to engage a cylinder wall, said ring comprising, a split resilient annulus having a groove in its outer face extending inwardly from one of its split ends, and a tongue extending from the opposite end of the ring and lying in the groove, the inner circumferential surface of the tongue snugly engaging the bottom of said groove, the outer extremity of said tongue lying within the groove when the ring is compressed being in the shape of a wedge having its apex disposed parallel to the axis of the ring and contiguous to the bottom of said groove and spaced radially inwardly from the outer periphery of the ring.

7. A piston ring having an outer face constructed to engage a cylinder wall, said ring comprising, a split resilient annulus having a groove in its outer face extending inwardly from one of its split ends, and an arcuate tongue extending from the opposite end of the ring and lying in the groove, the inner circumferential surface of the tongue snugly engaging the bottom of said groove, the outer extremity of said tongue lying within the groove when the ring is compressed being in the shape of a wedge having its apex disposed parallel to the axis of the ring and contiguous to the bottom of said groove and spaced radially inwardly from the outer periphery of the ring and circumferentially toward the split end of the ring from the end of the groove.

8. A piston ring having an annular face constructed to engage a surface moving relatively to said face, said ring comprising, a split resilient annulus having a groove in said annular face extending inwardly from one of its split ends, and a tongue extending from the opposite end of said annulus and lying in said groove, the extremity of the tongue being reduced radially in thickness to form a tapered end on said tongue less in width than that portion of the groove adjacent said tongue end, the latter being spaced radially inwardly toward the interior of the ring from said annular face of the ring when the ring is normally compressed.

WILLIAM S. BAKER.

References Cited in the file of this patent

UNITED STATES PATENTS

| Number | Name | Date |
|---|---|---|
| 68,914 | Tucker | Sept. 17, 1867 |
| 97,564 | Sullivan | Dec. 7, 1869 |
| 1,094,057 | Chevrolet | Apr. 21, 1914 |
| 1,294,199 | Torrance | Feb. 11, 1919 |
| 1,967,573 | Fox | July 24, 1934 |
| 1,975,344 | Baker | Oct. 2, 1934 |

FOREIGN PATENTS

| Number | Country | Date |
|---|---|---|
| 499,517 | France | Nov. 21, 1919 |